United States Patent
Tomas Manez et al.

(10) Patent No.: US 12,374,994 B2
(45) Date of Patent: Jul. 29, 2025

(54) CONSTANT POWER BUCK-BOOST POWER CONVERTER AND METHODS

(71) Applicant: Infineon Technologies Austria AG, Villach (AT)

(72) Inventors: Kevin Tomas Manez, Villach (AT); Juan Miquel Martinez Sanchez, Villach (AT)

(73) Assignee: Infineon Technologies Austria AG, Villach (AT)

( * ) Notice: Subject to any disclaimer, the term of this patent is extended or adjusted under 35 U.S.C. 154(b) by 301 days.

(21) Appl. No.: 18/093,511

(22) Filed: Jan. 5, 2023

(65) Prior Publication Data
US 2024/0235397 A1   Jul. 11, 2024

(51) Int. Cl.
*H02M 3/158*   (2006.01)
*H02M 1/00*   (2006.01)
*H02M 3/335*   (2006.01)

(52) U.S. Cl.
CPC ....... *H02M 3/1582* (2013.01); *H02M 1/0093* (2021.05); *H02M 3/33573* (2021.05); *H02M 3/33584* (2013.01); *H02M 1/0064* (2021.05); *H02M 3/158* (2013.01)

(58) Field of Classification Search
CPC .... H02M 3/156; H02M 3/158; H02M 3/1582; H02M 1/0064; H02M 1/0093; H02M 3/335; H02M 3/33573; H02M 3/33584
See application file for complete search history.

(56) References Cited

U.S. PATENT DOCUMENTS

| | | | |
|---|---|---|---|
| 10,910,943 B1* | 2/2021 | Lin | H02M 1/4225 |
| 11,569,746 B2* | 1/2023 | Fromme | H02M 3/158 |
| 2004/0095112 A1* | 5/2004 | Kernahan | H02M 1/0845 323/282 |
| 2014/0210437 A1* | 7/2014 | Chen | H02M 3/1584 323/271 |
| 2016/0276941 A1* | 9/2016 | Iwaya | H02M 3/3376 |
| 2017/0302149 A1* | 10/2017 | Bandyopadhyay | H03K 17/04123 |
| 2021/0194356 A1* | 6/2021 | Afridi | H02J 9/062 |
| 2022/0360176 A1* | 11/2022 | Giuntini | H02M 7/4833 |
| 2023/0253877 A1* | 8/2023 | Liu | H02M 1/4258 363/16 |

FOREIGN PATENT DOCUMENTS

| | | |
|---|---|---|
| WO | 2019076874 A1 | 4/2019 |
| WO | 2022130221 A1 | 6/2022 |

OTHER PUBLICATIONS

Schneider, Henrik, et al., "Isolated EWiRaC: A New Low-Stress Single-Stage Isolated PFC Converter," Jan. 2007 IEEE, downloaded Jul. 25, 2022, pp. 159-164.

(Continued)

*Primary Examiner* — Gary L Laxton
(74) *Attorney, Agent, or Firm* — Armis IP Law, LLC

(57) ABSTRACT

An apparatus as discussed herein can be configured to include a first bridge circuit operative to receive an input voltage supplied by an input voltage source. An inductor in the apparatus also receives the input voltage. The apparatus can be configured to include a second bridge circuit. The inductor provides coupling of the input voltage source to the second bridge circuit. The second bridge circuit produces an output voltage to power a load.

20 Claims, 19 Drawing Sheets

(56) References Cited

OTHER PUBLICATIONS

XDPP1100 two-phase interleaved buck-boost, -48 V to 28 V 780 W digital power supply, Application Note, V 1.0, Sep. 20, 2021, pp. 1-46, Published by Infineon Technologies AG.
Extended Search Report, EP 24 15 0301, May 31, 2024, pp. 1-9.
Hosseini S. H., et al, "A New Configuration of Modular Isolated Bidirectional DC-DC Converter", Eletrical&Computer Engineering (CCECE), 2012 25th IEEE Canadian Conference On, IEEE, May 4, 2014 (May 4, 2014), pp. 1-6, XP032643840.

\* cited by examiner

1100

CONSTANT POWER BUCK-BOOST POWER CONVERTER AND METHODS

BACKGROUND

In applications where a DC-DC converter is required to step-up and step-down wide input voltage ranges, current state-of-the-art power conversion solutions lead to non-efficient and bulky solutions. System requirements in this applications typically require larger power ratings and larger power densities, which cannot be achieved with current state-of-the-art. For example, a step-up/-down converters are required in the telecom base station power amplifier power supply unit. However, in fifth-generation (5G) communication, power supply units are required to support higher power ratings with high efficiency and power density, which is becoming a major challenge with current state-of-the-art.

A conventional topology for step-up and step-down the input voltage is the four switches buck boost converter illustrated in FIG. 1.

In applications where the input voltage is negative, such as telecom applications without an inverting pre-stage, the conventional inverting buck-boost converter is commonly used. Similar to the previous topology, the inverting buck-boost converter requires a bulky inductor with the additional disadvantage that power transfer is always performed from input to inductor and from the inductor to the output resulting in large RMS currents. Furthermore, switching devices voltage rating have to be >Vin+Vmax.

FIG. 2 is an example diagram illustrating of a conventional two stage interleaved inverting buck-boost.

Other DC-DC converters employed for step-up and step-down conversion are magnetically coupled converters, such as the Dual-Active-Bridge or the Isolated Buck Converter, which make use of the transformer turns ratio to achieve the desired voltage gain. These solutions typically do not outperform in efficiency and power density when stepping-up and down wide input voltage ranges.

BRIEF DESCRIPTION

This disclosure includes the observation that the topology in FIG. 1 has certain disadvantages, especially for high power ratings and high power density applications:
Bulky inductor
When input-to-output voltage gain is ~1, the four devices are switching, leading to increased switching losses
When input-to-output voltage gain is below or above 1, one of the high-side devices has to be kept in on-state, leading to increased conduction losses and increase complexity in the gate driver circuitry (no bootstrap)
Scalability for higher power is rather complex, since it typically requires paralleling stages.

In contrast to conventional techniques, the novel apparatus (such as a power converter) as discussed herein can be configured to include a first bridge circuit operative to receive an input voltage supplied by an input voltage source; an inductor operative to receive the input voltage; and a second bridge circuit. The inductor provides coupling of the input voltage source to the second bridge circuit. The second bridge circuit produces an output voltage to power a load.

The second bridge circuit may include a first switch and a second switch, each of which supports bidirectional voltage blocking depending on switch control settings generated by a controller.

The transformer may be configured to provide coupling of the first bridge circuit to the second bridge circuit. The transformer may include: a first transformer winding and a second transformer winding; the first transformer winding may be disposed in the first bridge circuit; and the second transformer winding may be disposed in the second bridge circuit. The first transformer winding may be magnetically coupled to the second transformer winding.

Note further that the first bridge circuit may include first switches. The second bridge circuit may include second switches. The apparatus as further discussed herein may include a controller operative to control states of the first switches and the second switches to convert the input voltage into the output voltage based on an error voltage signal derived from a difference between a magnitude of the output voltage and a setpoint reference voltage.

Yet further, the apparatus the inductor, the second bridge circuit, the load, and/or the power supply may be connected in series.

The apparatus as discussed herein can be configured to operate in a bidirectional mode in which a voltage received at the output node is converted into a second voltage outputted from the input node of the power converter.

Still further, as discussed herein, the apparatus may include: a first switch device disposed in the second bridge circuit, the first switch device being a 4-quadrant switch device; a second switch device disposed in the second bridge circuit, the second switch device being a 4-quadrant switch device; and a controller operative to control switching of the first switch device and the second switch device.

The apparatus may include: an first node to receive the input voltage from the input voltage source; a second node to output the output voltage; and a circuit path including the inductor and the second bridge circuit connected in series between the first node and the second node. In such an instance, the load may be connected between the second node and a ground reference potential; the first bridge circuit may be connected between the first node and the ground reference potential. Yet further, the first bridge circuit may include a first transformer winding; and the second bridge circuit may include a second transformer winding. The second transformer winding magnetically may be coupled to the first transformer winding.

As previously discussed, the apparatus as discussed herein may be a bidirectional power converter. For example, the power converter as discussed herein can be configured to receive a voltage at the second node, convert the received voltage into a second voltage, and of the second voltage from the first node.

A first axial end of the inductor of the apparatus may be coupled to receive first current from the input voltage source; a second axial end of the inductor may be coupled to supply the received first current to the second bridge circuit. In such an instance, the first bridge circuit may be coupled to receive second current from the input voltage source; based on manufacturing coupling, the second current through the first bridge circuit may contribute to a flow of current through a transformer winding of the second bridge circuit.

Yet further, the apparatus as discussed herein may further include: a controller operative to control a duty cycle of controlling switches in the second bridge circuit, the controller operative to prevent the duty cycle from falling below 50%.

In still further examples, the first bridge circuit, the inductor device, and the second bridge circuit may reside in power converter circuitry operative to generate the output voltage. The apparatus may further include: a controller operative to switch between operating the power converter circuitry in a buck mode and a boost mode depending on a magnitude of the output voltage with respect to a magnitude of the input voltage.

In accordance with another example, the apparatus as discussed herein may include: a first transformer winding disposed in the first bridge circuit; a second transformer winding disposed in the second bridge circuit; and a controller operative to: i) control a flow of first current through the first transformer winding, the first flow of current supplied by the input voltage source, and ii) control a flow of second current through the second transformer winding to produce the output voltage, the flow of second current supplied by the input voltage source.

Still further, the first bridge circuit may include a first transformer winding magnetically coupled to a second transformer winding disposed in the second bridge circuit. The apparatus may further include: a controller operative to: i) alternate a polarity of connecting the first transformer winding in a first circuit path extending through the first bridge circuit between the input voltage source and a ground reference potential, and ii) alternate a polarity of connecting the second transformer winding in a second circuit path extending between the inductor device and an output node outputting the output voltage.

The apparatus as discussed herein may further include: a controller operative to switch between: i) a first mode of bypassing a transformer winding in the second bridge circuit to convey current received from the inductor to an output node of the power converter outputting the output voltage to power the load, and ii) a second mode of connecting the transformer winding in a series circuit path between the inductor and the output node to produce the output voltage to power the load.

In accordance with still further examples, the first bridge circuit as discussed herein may be a first H-bridge circuit including a first transformer winding; the second bridge circuit may be a second H-bridge circuit including a second transformer winding. As previously discussed, the second transformer winding may be magnetically coupled to the first transformer winding.

Further examples as discussed herein include a method comprising: controlling a flow of first current through a first transformer winding, the first transformer winding disposed in a first bridge circuit of a power converter circuit, the flow of first current supplied by an input voltage generated by an input voltage source; and controlling a flow of second current through a second transformer winding to produce an output voltage outputted from an output node of the power converter circuit to power a load, the second transformer winding disposed in a second bridge circuit, the second current supplied by an inductor device coupled between the input voltage source and the second bridge circuit, the second transformer winding magnetically coupled to the first transformer winding.

Controlling the flow of first current as discussed herein may include alternating a polarity of connecting the first transformer winding in a first circuit path extending between the input voltage source through the first bridge circuit to a ground reference potential; and in which controlling the second flow of current includes alternating a polarity of connecting the second transformer winding in a second circuit path extending between the inductor device through the second bridge circuit to the output node. These and other more specific examples are disclosed in more detail below.

Note further that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different examples as described herein.

Yet other examples herein include software programs to perform the steps and operations summarized above and disclosed in detail below. One such example comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, examples herein are directed to methods, systems, computer program products, etc., that support operations as discussed herein.

One example herein includes a computer readable storage medium and/or system having instructions stored thereon. The instructions, when executed by computer processor hardware, cause the computer processor hardware (such as one or more co-located or disparately located processor devices) to: control a flow of first current through a first transformer winding, the first transformer winding disposed in a first bridge circuit of a power converter circuit, the flow of first current supplied by an input voltage generated by an input voltage source; and control a flow of second current through a second transformer winding to produce an output voltage outputted from an output node of the power converter circuit to power a load, the second transformer winding disposed in a second bridge circuit, the second current supplied by an inductor device coupled between the input voltage source and the second bridge circuit, the second transformer winding magnetically coupled to the first transformer winding.

The ordering of the steps above has been added for clarity sake. Note that any of the processing operations as discussed herein can be performed in any suitable order.

Other examples of the present disclosure include software programs and/or respective hardware to perform any of the method example steps and/or operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing different gain control implementations to deliver current to a load such as a motor winding that supplies torque. However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION) purposefully does not specify every example and/or incrementally novel aspect of the present disclosure or claimed invention(s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

Figure 1:
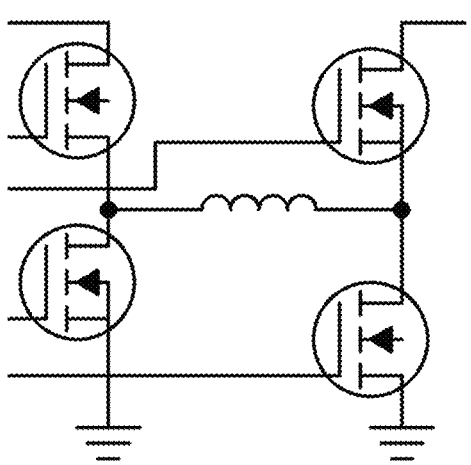
FIG. 1 is an example general diagram of a parallel series arrangement of DCDC converter for buck-boost operation according to conventional techniques.
Figure 2:
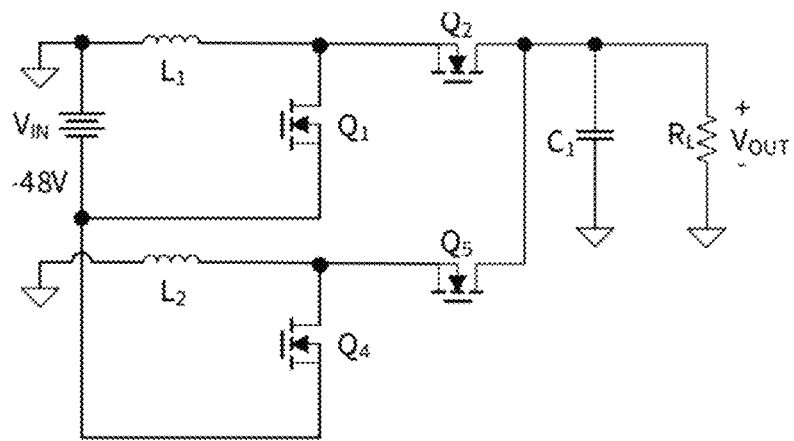
FIG. 2 is an example diagram illustrating a conventional two-stages interleaved inverting buck-boost.

The foregoing and other objects, features, and advantages of the invention will be apparent from the following more particular description of preferred examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

An apparatus (such as power supply, power converter, circuitry, etc.) as discussed herein can be configured to include a first bridge circuit, a second bridge circuit, and an inductor. In a first mode of operation, the first bridge circuit receives an input voltage at a first node; the input voltage is supplied to the first node by an input voltage source. The inductor receives the input voltage in the first mode. The inductor may be coupled between the input voltage source and the second bridge circuit. Based on energy received from a combination of the inductor and the first bridge circuit, the second bridge circuit produces an output voltage from a second node of the apparatus to power a load while in the first mode.

The apparatus as discussed herein can be configured to operate in a second mode in which the second node receives the input voltage. In the second mode, the apparatus converts the input voltage received at the second node and produces a corresponding output voltage outputted from the first node.

Figure 3:
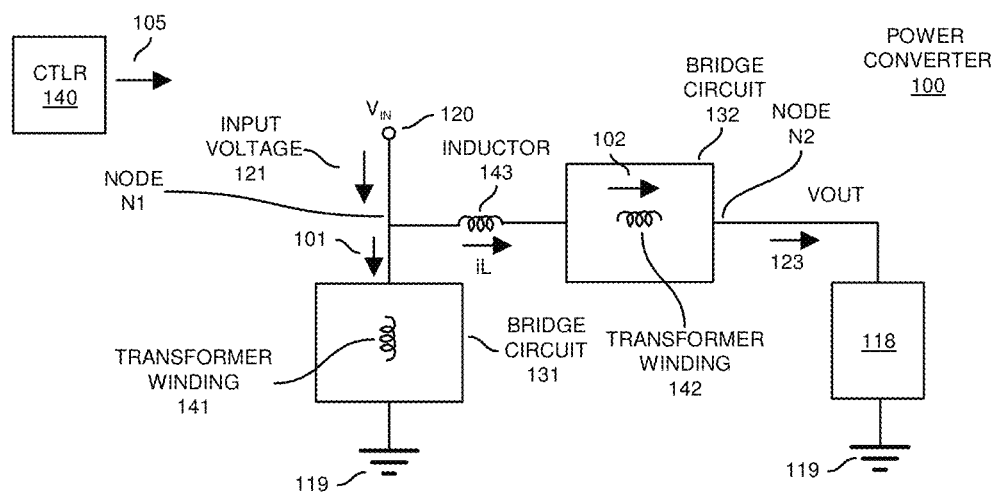
FIG. 3 is an example diagram illustrating a bidirectional power converter as discussed herein.

Now, more specifically, FIG. 3 is an example diagram illustrating a power converter as discussed herein.

As shown, the power converter 100 (such as a bidirectional power converter) in FIG. 3 includes input voltage source 120, inductor 143, bridge circuit 131, and bridge circuit 132. The bridge circuit 131 includes transformer winding 141. The bridge circuit 132 includes the transformer winding 142. As further discussed herein, the transformer winding 141 may be magnetically coupled to the second transformer winding 142.

Further in this example, in a first circuit path, the bridge circuit 131 is connected between the input voltage source 120 and the ground reference potential 119. In a second circuit path, the combination of inductor 143 and bridge circuit 132 and component 118 (such as a load, voltage source, etc.) are coupled in series. In the first mode, the second circuit path generates a respective output voltage 123 that powers the corresponding component 118 when it is a load consuming power.

As further discussed herein, note that the component 118 may be a voltage source. Operation of the power converter 100 includes receiving a voltage from the component 118 and supplying energy or power from the component 118 to the voltage source 120. More specifically, the power converter 100 can be configured to receive a voltage from component 118 and convert it into a voltage outputted to the voltage source 120.

In accordance with one example, the controller 140 is operative to control and/or apply one or more control signals to the bridge circuit 131 and/or bridge circuit 132 to support functionality as discussed herein such as conversion of the input voltage 121 into the output voltage 123. For example, in an example in which the power converter 100 powers the component 118 such as a load, via control signals 105, the controller 140 controls a flow of current 101 through the transformer winding 141. As previously discussed, the transformer winding 141 may be disposed in the bridge circuit 131 of the power converter 100 (i.e., power converter circuit). The flow of the current 101 is supplied by the input voltage 121 generated by the input voltage source 120.

The controller 140 also can be configured to control a flow of current 102 through the transformer winding 142 to produce an output voltage 123 outputted from a node N2 of the power converter 100 to power the component 118. As previously discussed, the transformer winding 142 is disposed in the bridge circuit 132. The current 102 is supplied at least in part by the inductor 143 (i.e., inductor device) coupled between the input voltage source 120 and the bridge circuit 132. As previously discussed, the transformer winding 142 may be magnetically coupled to the transformer winding 141.

Figure 4A:
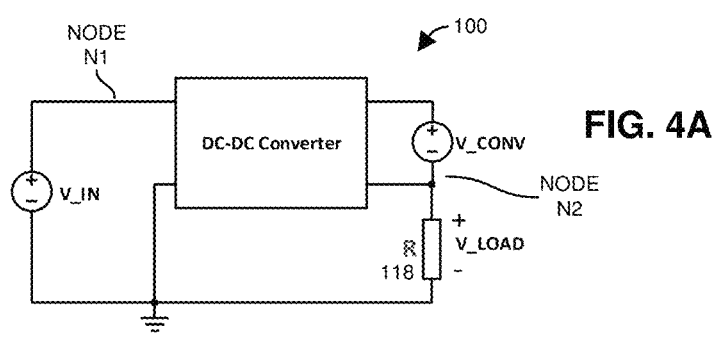
FIG. 4A is an example diagram of a power converter as described herein.
Figure 4B:
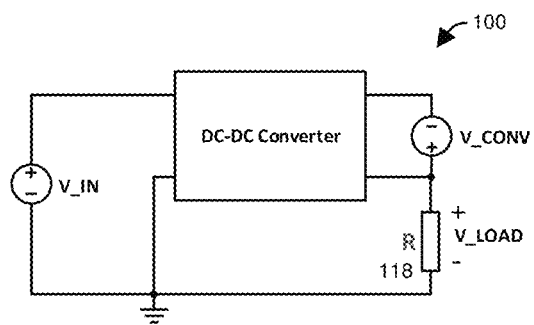
FIG. 4B is an example diagram illustrating a power converter as described herein.

FIGS. 4A and 4B are example block diagrams of the power converter as described herein.

Example circuitry as discussed herein includes a bidirectional switched mode pulse width modulated DC-DC converter (such as power converter 100) for implementation in high power or other suitable applications. In contrast to conventional solutions, the DC-DC converter (power converter 100) as discussed herein can be placed in parallel with the source and the load 118. The power converter may be configured to make use of the so called Differential Power Processing (DPP) concept, with parallel and serial connectivity.

FIGS. 4A and 4B illustrate a generic example of the power converter architecture, which shows the DC-DC converter 100 being connected in series with the circuit component 118, which may be either a power source or a load as previously discussed. More specifically, when the component 118 acts as a source, then the DC-DC converter is connected in series with the source (component 118) and the V_IN voltage source or input terminal of the DC-DC converter acts as a load. If component 118 is a load that consumes power, then the V_IN terminal of the DC-DC converter is a voltage source. Either way, the DC-DC converter as discussed herein represents a parallel configuration on one side whilst a series connection on the other.

If the component 118 is a load powered by a large voltage (such as Vload), the series connection of the DC-DC converter and the load will cause a voltage sharing between these two units such that the DC-DC converter will only have part of the total voltage and only a small portion of the output power will be processed by the power converter. This solution can therefore significantly increase the full system efficiency and power density.

As further discussed herein, the solution of this disclosure differs from conventional solutions based on DPP (Differential Power Processing) because it also enables operation in a so-called boost mode (where V_IN<V_LOAD) and a buck mode (where V_IN>V_LOAD).

Note that the buck-boost operation as discussed herein may be achieved by means of generating a positive or negative voltage between Vin and node N2, which may be obtained by implementation of a DC-DC converter including one or more 4-quadrant switch devices. Advantageously, as further discussed and illustrated herein, the 4-quadrant switch devices are able to block voltages in either direction.

Note further that during instances in which the voltage V_LOAD is closer in magnitude to the input voltage VIN, the DC-DC power converter processes less power to produce the output voltage. An example of the DC-DC power converter (100) as discussed herein is more particularly shown in FIG. 6.

Figure 5:
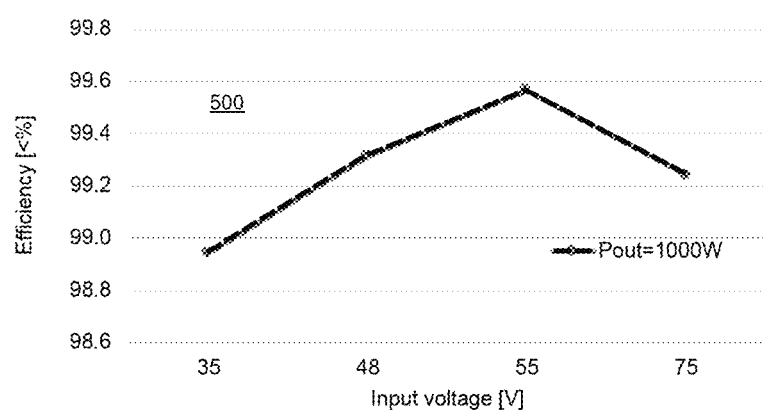
FIG. 5 is an example diagram illustrating efficiency versus input voltage for a power converter as described herein.

FIG. 5 is an example diagram illustrating efficiency versus input voltage for a power converter as described herein.

Figure 6:
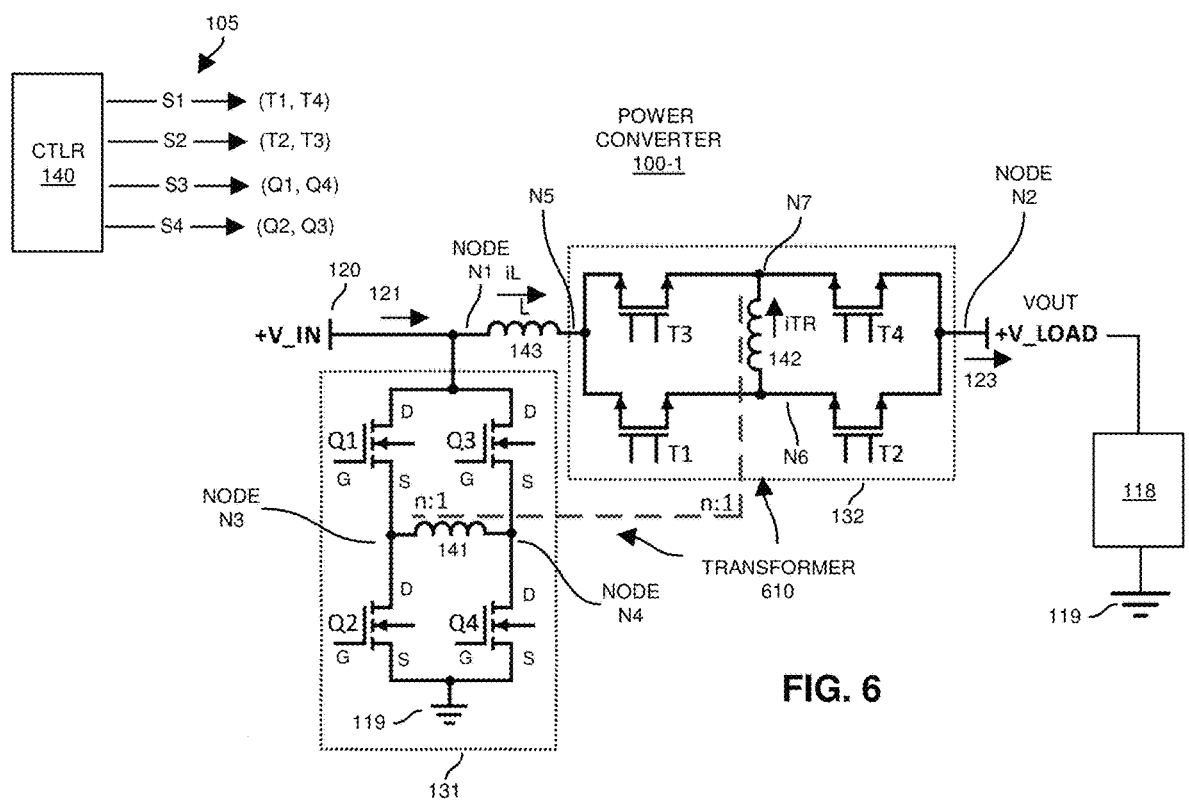
FIG. 6 is an example diagram illustrating a power converter with 4 quadrant, drain power devices as described herein.

One advantage of the topology of the power converter 100 as discussed herein is the very high efficiency achieved for the entire voltage and power range. For example, FIG. 5 shows the hypothetical efficiency such as extracted from simulations (semiconductor's loss) and theoretical calculations (passive components' loss) for the specifications listed below using the more detailed power converter 100-1 as shown in FIG. 6. The following is a list of parameters associated with the power converter as discussed herein, although the parameters may vary depending on the application.

Output voltage V_LOAD=50 V
Output power 1000 W
Switching frequency 100 kHz
Inductor 4.2 uH (15.2×16.2 mm2)
Transformer 2:1 (15.5×12.4 mm2)

FIG. 6 is an example diagram illustrating a buck boost converter with 4 quadrant, drain power devices as described herein.

In this example, the bridge circuit 131 of power converter 100-1 (instance of power converter 100) includes switches Q1, Q2, Q3, and Q4. The switches Q1, Q2, Q3, and Q4 can be transistors such as field effect transistors or any other suitable type of component.

As further shown, the bridge circuit 132 of power converter 100-1 includes switches T1, T2, T3, and T4. The switches T1, T2, T3, and T4 can be transistors such as so-called 4-quadrant switches. Additionally, each of the switches T1, T2, T3, and T4 can be implemented as a so-called bidirectional transistor, capable of block voltage or current in each of two different directions through the switch. More particularly, each of the switches T1 through T4 can be a bidirectional switch such as an active switch that has the ability to block the current in both directions.

Thus, the switch T1 in an OFF-state blocks current through the switch T1 blocks current/voltage from the node N5 to the node N6; the switch T1 in an OFF-state blocks passing of current through the switch T1 from the node N6 to the node N5.

The switch T2 in an OFF-state blocks a flow of current through the switch T2 from the node N2 to the node N6; the switch T2 in an OFF-state blocks a flow of current through the switch T2 from the node N6 to the node N2.

The switch T3 in an OFF-state blocks a flow of current through the switch T3 from the node N7 to the node N5; the switch T3 in an OFF-state blocks a flow of current through the switch T3 from the node N5 to the node N7.

The switch T4 in an OFF-state blocks a flow of current through the switch T4 from the node N2 to the node N7; the switch T4 in an OFF-state blocks a flow of current through the switch T4 from the node N7 to the node N2.

As further shown, the power converter 100-1 includes controller 140. Controller 140 generates control signals 105 such as: i) one or more control signals S1 driving the input nodes and controlling states of switches T1 and T4; ii) one or more control signals S2 driving the input nodes and controlling states of switches T2 and T3; iii) one or more control signals S3 driving the gate nodes G and controlling states of switches Q1 and Q4; and iv) one or more control signals S4 driving the gate nodes G and controlling states of switches Q2 and Q3.

Yet further, the input voltage source 120 supplies input voltage 121 to node N1 such as a first axial end of the inductor 143, which is coupled to receive first current from the input voltage source 120. A second axial end of the inductor 143 is coupled to supply the received current to the second bridge circuit 132.

The bridge circuit 131 is coupled to the node N1 and receives second current from the input voltage source 120. The current through the bridge circuit 131 and transformer winding 141 at least partially controls a magnitude of current through transformer winding 142 of the second bridge circuit 132.

The switch Q1 is connected in series with switch Q2 between the node N1 and the ground reference potential 119. More specifically, the drain node (D) of the switch Q1 is connected to node N1; the source node (S) of the switch Q1 is connected to the drain node (D) of switch Q2 at node N3; the source node (S) of switch Q2 is connected to the ground reference potential 119.

Still further, the switch Q3 is connected in series with switch Q4 between the node N1 and the ground reference potential 119. More specifically, the drain node (D) of the switch Q3 is connected to node N1; the source node (S) of the switch Q3 is connected to the drain node (D) of switch Q4 at node N4; the source node (S) of switch Q4 is connected to the ground reference potential 119.

The power converter 100-1 includes transformer 610. The transformer 610 includes transformer winding 141 and transformer winding 142. The transformer 610 can be configured to include one turn on the transformer winding 142 for each N turns of windings of the transformer winding 142, where N is any suitable value. Current iTR flows through transformer winding 142.

The transformer winding 141 associated with the bridge circuit 131 is connected between the node N3 and N4.

The transformer winding 142 is connected between node N6 and N7.

The inductor 143 (having inductance L) supplies current or voltage to the bridge circuit 132. Current iL flows through the inductor 143.

In the bridge circuit 132, the switch T1 is connected in series with switch T2 between the node N5 and the node N2. The switch T1 is connected between node N5 and node N6.

The switch T3 is connected in series with switch T4 between the node N5 and the node N2. The switch T3 is connected between node N5 and node N7. The switch T4 is connected between node N7 and node N2.

The combination (first circuit path) of the inductor 143, the second bridge circuit 132, and the component 118 (such as load) are connected in series between the node N1 and ground reference potential 119. The bridge circuit 131 is disposed in a second circuit path between the node N1 and the ground reference potential 119. Thus, the first circuit path is disposed in parallel with the second circuit path between node N1 and the ground reference potential 119.

As further discussed herein, generation of the control signals 105 results in the conversion of the input voltage 121 into the output voltage 123 to power the component 118. Note that the controller 140 of the power converter 100-1 can be configured to control states of the first switches Q1-Q4 and the second switches T1-T4 to convert the input voltage 121 into the output voltage 123 based on an error voltage signal derived from a difference between a magnitude of the output voltage and a setpoint reference voltage.

Thus, FIG. 6 shows an example implementation of the power converter 100 using isolated full-bridge boost converter. Full bridge switch Q1-Q4 (of bridge circuit 131) are connected in parallel with input voltage source 120 and can be implemented by conventional power devices, such as MOSFETs or GaN HEMTs. Full bridge T1-T4 (of bridge circuit 132) are connected in series in a circuit path including the inductor 143 between the input voltage source 120 and the component 118 such as a load. Switches T1-T4 in the bridge circuit 132 may be implemented with 4-quadrant devices, which could be common-source or common-drain type or any suitable type of transistor or switch. Note that the power converter 100-1 in FIG. 6 can be implemented with common drain bidirectional GaN HEMTs devices.

Note that the small amount of power losses associated with switching operation of the power converter 100-1 such as conversion of the input voltage 121 into the output voltage 123 are widely distributed among, at least, 8 switches (such as semiconductor power devices), one transformer 610 (such as including transformer winding 141 magnetically coupled to transformer winding 142) and inductor 143. The distribution of power losses improves the thermal performance of these components and circuit overall. This greatly reduces the heatsinking efforts, which improves the power density, and makes the power converter 100 a very attractive solution for fan-less applications. Note that the inductor (143) AC current frequency may be twice the switching frequency, leading to a reduced inductor size.

Very high power density of the power converter 100-1 can be achieved by operating at comfortable switching frequencies, e.g. 100 kHz, or any suitable frequency.

In this example of FIG. 6, the voltage stress of 4-quadrant devices (such as switches T1-T4) V_IN/network, where N is the number of switches such as 4 or other suitable value. Therefore, following the previous example, for Vin, max=75V and Vout=50V, maximum voltage stress of the devices would be 37.5V. Therefore, switches T1-T4 feature a reduced voltage stress factor. At the same time, RMS (Root Mean Square) current in switches Q1-Q4 are represented in equation 1 (where D=Duty Cycle), which results in reduced current stress.

$$I\_rms = Iout/n \sqrt{(1-D)} \qquad (1)$$

Note further that non-pulsating input and output current and voltage waveforms with relatively low AC content. This reduces input and output filtering effort.

If desired, power scalability can be well achieved by adjusting semiconductor's Rdson and magnetics' DCR, therefore power stages paralleling is not necessarily required.

Note further that the second implementation of the power converter configuration in FIG. 16 improves the presented solution as follows: i) By means of series and/or parallel connection of the transformer windings at the load side using different switching pattern combinations, the input-to-output voltage gain of the power converter 100-2 can be extended in order to fit wider input and output voltage ranges. ii) Current flowing through the DC-DC power converter 100-2 is distributed among more semiconductor devices (e.g., switches T1-T6) and transformer windings, therefore reducing conduction losses. This makes the instance of the power converter in FIG. 16 suited for higher power operation.

Figure 9:
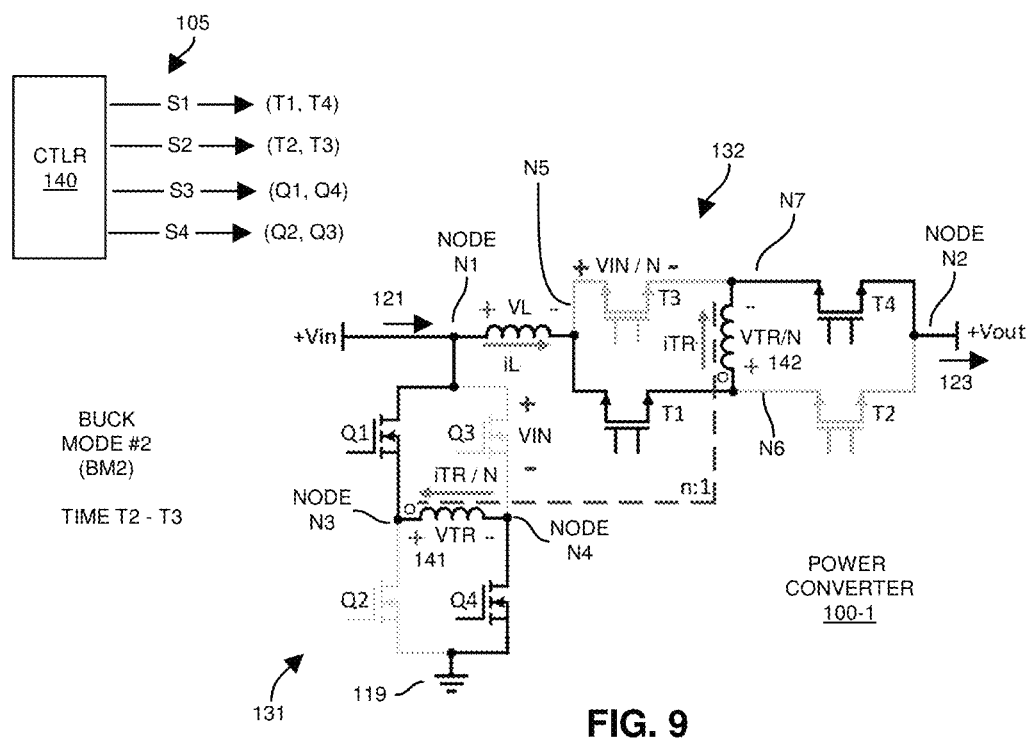
FIG. 9 is an example diagram illustrating a second mode of operating a power converter in a buck mode as described herein.
Figure 10:
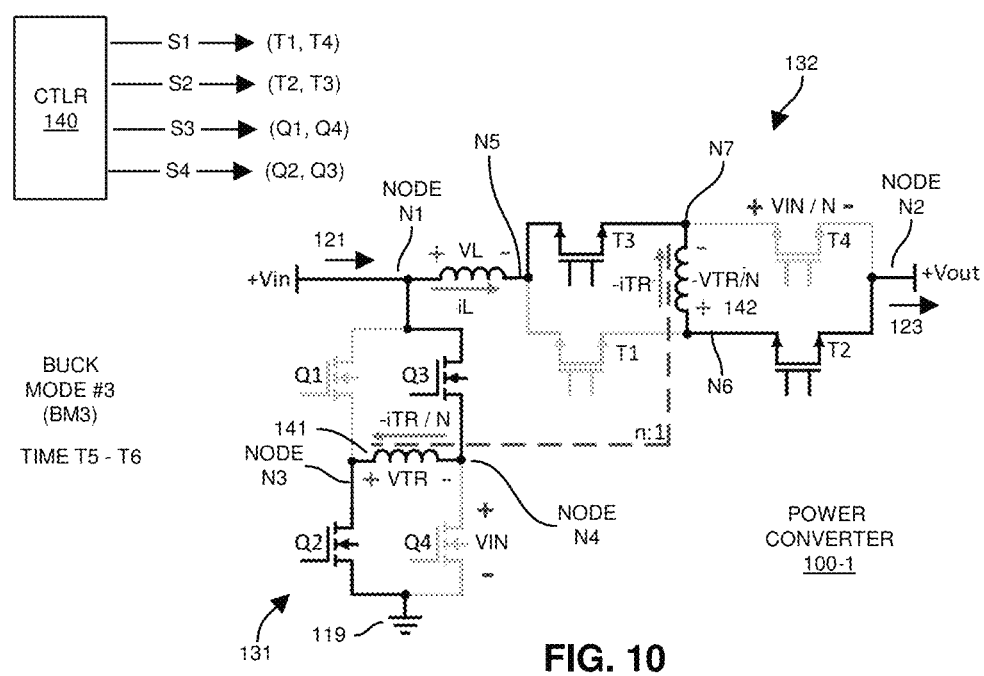
FIG. 10 is an example diagram illustrating a third mode of operating a power converter in a buck mode as described herein.
Figure 11:
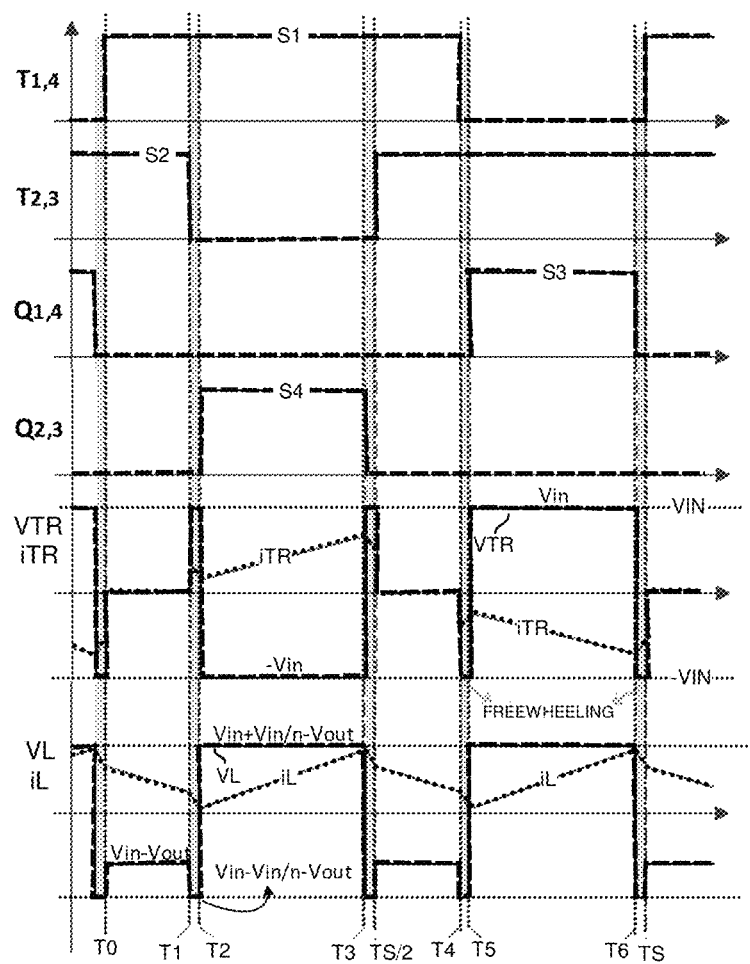
FIG. 11 is an example timing diagram illustrating operation of the power converter in a boost mode as described herein.

Note further that the main converter switching states and waveforms associated with operation of the power converter 100-1 are shown in FIGS. 7-10 for step down (so-called buck mode) and FIGS. 11-13 for step up (so-called boost mode). The controller 140 can be configured to switch between operating the power converter 100 in a buck mode and a boost mode depending on a magnitude of the output voltage 123 with respect to a magnitude of the input voltage 121.

Two pulse width modulated (PWM) signals with duty cycle D are applied to the H-bridge including by switches T1-T4, where a respective PWM signal with a phase-shift of 180° is applied to each diagonal pair. For example, as previously discussed, control signal S2 applied to switches T2 and T3 is phase shifted with respect to control signal S1 applied to switches T1 and T4. Therefore, switches T1-T4 have the same PWM signal as well as switches T2-T3. Note that the duty cycle (D) may be controlled (via controller 140) to ensure continuous current flow through the main inductor 143; therefore, the duty cycle D needs to always be >50%. In other words, the controller 140 controls a duty cycle of controlling switches in the bridge circuits and prevents the duty cycle from falling below 50%. Two PWM signals with duty cycle D'=1-D are applied to each diagonal pair of the H-bridge composed by switches Q1-Q4, being the diagonal pairs switches Q1-Q4 and switches Q2-Q3. Additionally, at the beginning and the end of each Ts*D' on-time, there may be a so-called blanking time wherein the bridge circuit 131 such as switches Q1-Q4 will be freewheeling. In order to shift from step-down mode or step-up mode, the PWM signals of bridge circuit 131 (such as H-bridge circuit) of switches Q1-Q4 will be phase-shifted from 0° to 180° with respect to the PWM signals from the bridge circuit 132 (such as H-bridge circuit) such as switches T1-T4.

As previously discussed, the controller 140 and corresponding power converter 100-1 can be configured to implement an output voltage regulation loop (such as comparison of the output voltage 123 to a setpoint reference voltage) to ensure that the DC output voltage 123 tracks the DC target voltage by regulating the duty cycle D to adjust the absolute voltage gain and the aforementioned phase-shift to shift between step-down and step-up operating modes.

Figure 7:
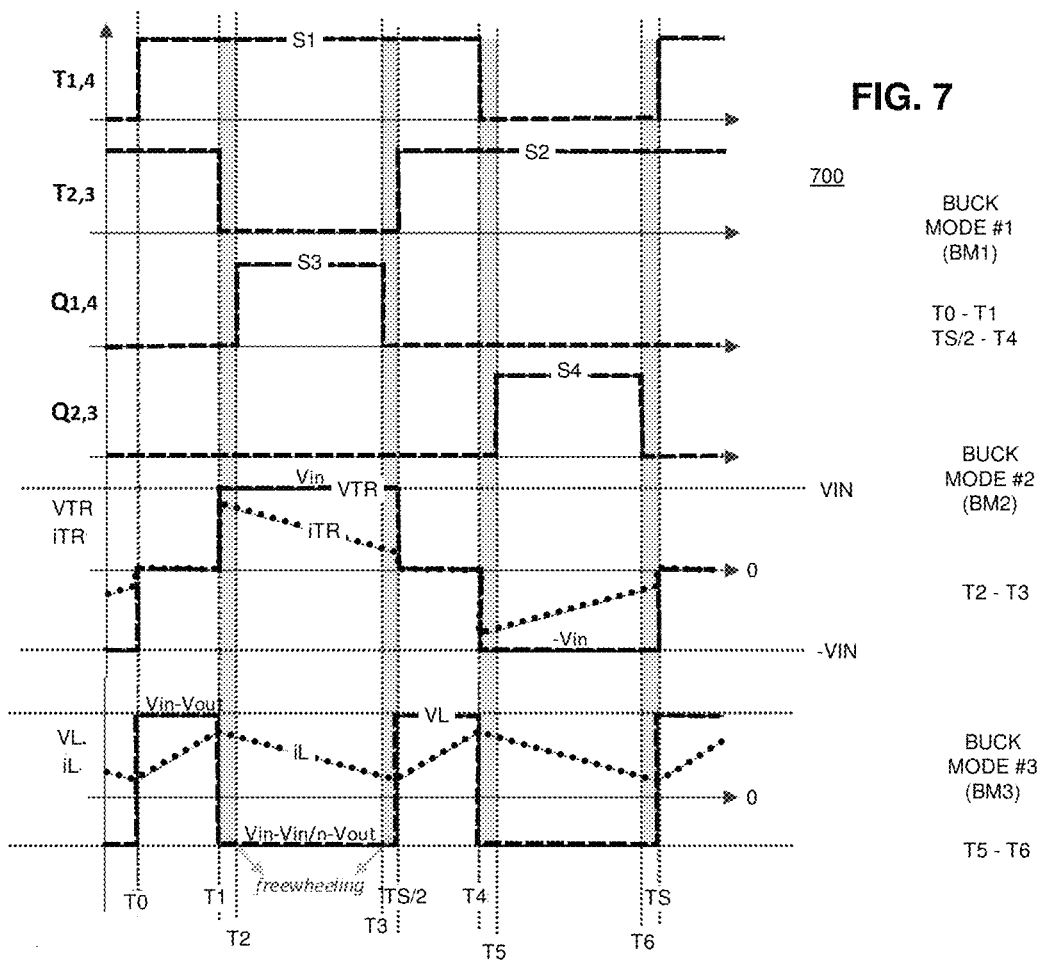
FIG. 7 is an example timing diagram of controlling a respective power converter in a buck mode as described herein.

FIG. 7 is an example timing diagram of controlling a respective power converter in a buck mode as described herein.

As previously discussed, the power converter 100 can be configured to operate in a buck converter mode and a boost converter mode.

As shown in FIGS. 7-10, the power converter 100-1 operates in a buck mode during cases in which a magnitude of the input voltage 121 is greater than a desired magnitude of the output voltage 123. As shown in FIGS. 11-14, the power converter 100-1 operates in a boost converter mode during cases in which a magnitude of the input voltage 121 is less than a desired magnitude of the output voltage 123.

Referring again to FIG. 7, the timing diagram 700 illustrates different buck converter operational modes of the power converter 100-1 over a respective control cycle between time T0 and TS. The pattern of the control cycle TS as shown in FIG. 7 repeats itself over time while the power converter 100 is in the buck converter mode.

As shown in the timing diagram 700, the controller 140:
  i) sets the control signal S1 to a logic high state between time T0 (beginning of cycle) and time T4; the controller 140 sets the control signal S1 to a logic low state between time T4 and time TS (end of cycle);
  ii) sets the control signal S2 to a logic high state between time T0 and time T1 and between time TS/2 and time TS; the controller 140 sets the control signal S2 to a logic low state between time T1 and time TS/2;
  iii) sets the control signal S3 to a logic high state between time T0 and time T2; the controller 140 sets the control signal S3 to a logic low state between time T0 and time T2 as well as between time T3 and time TS; and
  iv) sets the control signal S4 to a logic high state between time T5 and time T6; the controller 140 sets the control signal S4 to a logic low state between time T0 and time T5 as well as between time T6 and time TS.

In general, between time T0 and time T1 as well as between time TS/2 and time T4 of the cycle, the current iTR through the transformer winding 142 is zero and the magnitude of the voltage VTR is zero. Between time T1 and time TS/2, the magnitude of the voltage VTR across the winding 142 is VIN. Between time T4 and time TS, the magnitude of the voltage VTR across the winding 142 is −VIN.

The magnitude of current iTR decreases between time T1 and time TS/2. The magnitude of current −iTR decreases towards zero between time T4 and time TS.

The magnitude of current iL decreases between time T1 and time TS/2 as well as between time T4 and time TS. The magnitude of current iL increases between time T0 and time T1 as well as between time TS/2 and time T4.

Figure 8:
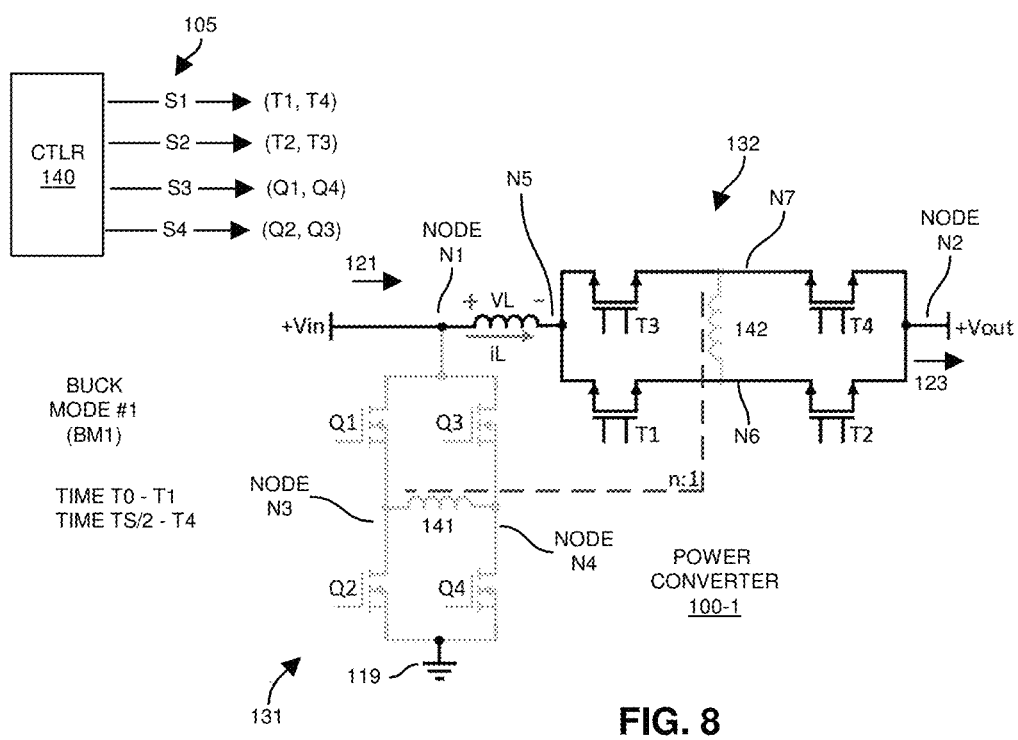
FIG. 8 is an example diagram illustrating a first mode of operating a power converter in a buck mode as described herein.

FIG. 8 is an example diagram illustrating a first operational mode of a buck boost converter as described herein.

While in the buck mode BM1 or (Buck Mode #1), and between time between time T0 and time T1 as well as between time TS/2 and time T4, the controller 140 controls switches T1, T2, T3, and T4 to ON states as shown in FIG. 8. The controller 140 controls the switches Q1, Q2, Q3, and Q4 to OFF states between time T0 and time T1 as well as between time TS/2 and time T4.

During such time ranges of operating in buck mode BM1, the input voltage source 120 supplies the input voltage 121 to the node N1 of the inductor 143. The current iL through the inductor device 143 produces output voltage 123 at the node N2. For example, as previously discussed, the switches T1-T4 are all ON during mode BM1, providing a low impedance path between the node N1 and node N2. The voltage VTR across is zero.

Note that the BM1 to some extent may be considered a bypass mode in which the current from the transformer winding 142 does not contribute to generation of the output voltage 123. In modes BM2 and BM3 as further discussed below, the controller 140 operates in a mode of connecting the transformer winding 142 in a series circuit path between the inductor 143 and the output node N2 to produce the output voltage 123 to power the load.

Thus, the controller 140 can be configured to switch between: i) a first mode of bypassing a transformer winding 142 in the bridge circuit 132 to convey current received from the inductor 143 to an output node N2 outputting the output voltage 123, and ii) a second mode of connecting the transformer winding 142 in a series circuit path between the inductor 143 and the output node N2 to produce the output voltage 123 to power the load.

FIG. 9 is an example diagram illustrating second operational mode of a buck boost converter as described herein.

While in the buck mode BM2 or (Buck Mode #2), and between time T2 and time T3, the controller 140 controls switches Q1, Q4, T1, and T4 to ON states as shown in FIG. 9. The controller 140 controls the switches Q2, Q3, T2, and T3 to OFF states between time T2 and time T3.

During time range T2 to T3, while in buck mode BM2, the input voltage source 120 supplies the input voltage 121 to the node N1 of the inductor 143. The current iL through the inductor device 143 flows through switch T1, transformer winding 142, and switch T4, contributing to generation of the output voltage 123 at the node N2.

The OFF state of the switch T2 during the buck mode BM2 prevents current from flowing through the switch T2 from node N6 and node N2 as well as prevents any current from flowing between node N2 and node N6.

The OFF state of the switch T3 during the buck mode BM2 prevents current from flowing through the switch T3 from node N7 and node N5, as well as prevents current from flowing through the switch T3 from node N5 and node N7.

Yet further, activation of the switch Q1 and the switch Q4 during the buck mode BM2 causes connectivity of the transformer winding 141 between the node N1 and the ground reference potential 119. The activation of the switches Q1 and Q4 thus causes a flow of current through the transformer winding 141. As previously discussed, the transformer winding 141 is magnetically coupled to the transformer winding 142. Based on the magnitude coupling, the current iTR/N through the transformer winding 131 contributes to the flow of current iTR through the transformer winding 142.

Accordingly, the generation of the output voltage 123 and corresponding flow of current iTR through the transformer winding 142 is based upon a combination of current iL through the inductor 143 as well as energy transferred between the transformer winding 141 to the transformer winding 142.

FIG. 10 is an example diagram illustrating a third operational mode of a buck boost converter as described herein.

During time range T5 to T6, while in buck mode BM3, the input voltage source 120 supplies the input voltage 121 to the node N1 of the inductor 143. The current iL through the inductor device 143 flows through switch T3, transformer winding 142, and switch T2, contributing to generation of the output voltage 123 at the node N2.

The OFF state of the switch T4 during the buck mode BM3 prevents current from flowing through the switch T4 from node N7 and node N2 as well as prevents any current from flowing between node N2 and node N7.

The OFF state of the switch T1 during the buck mode BM3 prevents current from flowing through the switch T1 from node N6 and node N5, as well as prevents current from flowing through the switch T1 from node N5 and node N6.

Yet further, activation of the switch Q2 and the switch Q3 during the buck mode BM3 causes connectivity of the transformer winding 141 between the node N1 and the ground reference potential 119. The activation of the switches Q2 and Q3 causes a flow of current through the transformer winding 141. As previously discussed, the transformer winding 141 is magnetically coupled to the transformer winding 142. The current −iTR/N through the transformer winding 131 contributes to the flow of current −iTR through the transformer winding 142.

Accordingly, the generation of the output voltage 123 and corresponding flow of current −iTR through the transformer winding 142 is based upon a combination of current iL through the inductor 143 as well as energy transferred between the transformer winding 141 to the transformer winding 142.

Thus, via operation of the power converter 100-1 in the different modes, the controller 140 alternates a polarity of connecting the first transformer winding 141 in a first circuit path extending through the first bridge circuit 131 between the input voltage source 120 and a ground reference potential 119. More specifically, in mode BM2, via activation of switches Q1 and Q4, the controller 140 connects a first axial end (node N3) of the transformer winding 141 to the node N1 and a second axial end (node N4) of the transformer winding 141 to the ground reference potential 119. In mode BM3, via activation of switches Q2 and Q3, the controller 140 connects the first axial end (node N3) of the transformer winding 141 to the ground reference potential 119 and the second axial end (node N4) of the transformer winding 141 to the node N1.

The controller 140 alternates a polarity of connecting the second transformer winding 142 in a second circuit path extending between the inductor device 143 (node N5) and an output node N2 outputting the output voltage 123. More specifically, in mode BM2, the controller 140 connects a first axial end (node N6) of the transformer winding 142 to the node N5 and a second axial end (node N7) of the transformer winding 142 to the node N2. In mode BM3, the controller 140 connects the first axial end (node N6) of the transformer winding 142 to the node N2 and the second axial end (node N7) of the transformer winding 141 to the node N5.

FIG. 11 is an example timing diagram of controlling a respective power converter in a boost mode as described herein.

As previously discussed, the power converter 100-1 can be configured to operate in a boost converter mode during cases in which a magnitude of the input voltage 121 is less than a desired magnitude of the output voltage 123.

The timing diagram 1100 illustrates different boost converter operational modes of the power converter 100-1 over a respective control cycle between time T0 and TS. The pattern of the control cycle is shown in FIG. 11 repeats itself over time while the power converter 100 is in the boost converter mode.

As shown in the timing diagram 1100, the controller 140:
i) sets the control signal S1 to a logic high state between time T0 and time T4; the controller 140 sets the control signal S1 to a logic low state between time T4 and time TS (end of cycle);
ii) sets the control signal S2 to a logic high state between time T0 and time T1 and between time TS/2 and time TS; the controller 140 sets the control signal S2 to a logic low state between time T1 and time TS/2;
iii) sets the control signal S3 to a logic high state between time T5 and time T6; the controller 140 sets the control signal S3 to a logic low state between time T0 and time T5 as well as between time T6 and time TS; and
iv) sets the control signal S4 to a logic high state between time T2 and time T3; the controller 140 sets the control signal S4 to a logic low state between time T0 and time T2 as well as between time T3 and time TS.

As further discussed below, the controller 140 controls the power converter 100-1 and corresponding switches in boost mode A (a.k.a., BMA) between time T0 and time T1 as well as between time TS/2 to time T4.

The controller 140 controls the power converter 100-1 and corresponding switches in boost mode B (a.k.a., BMB, or free-wheeling mode in which current flows through a circuit path including parasitic diode of switch Q1, transformer winding 141, and a parasitic diode of switch Q3) between time T1 and time T2 and between time T3 and TS/2.

The controller 140 controls the power converter 100-1 and corresponding switches in boost mode C (a.k.a., BMC) between time T2 and time T3.

The controller 140 controls the power converter 100-1 and corresponding switches in boost mode D (a.k.a., BMD) between time T5 and time T6.

The controller 140 controls the power converter 100-1 and corresponding switches in boost mode E (a.k.a., BME, or free-wheeling mode in which current flows through a circuit path including parasitic diode of switch Q2, transformer winding 141, and a parasitic diode of switch Q4) between time T4 and time T5 and between time T6 and TS.

Figure 12A:
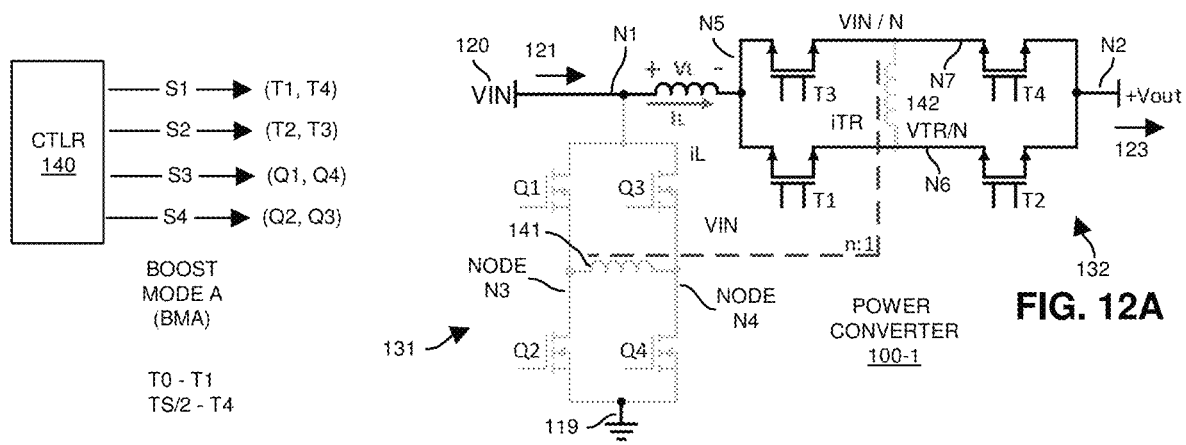
FIG. 12A is an example diagram illustrating a first operational mode of operating a power converter in a boost mode as described herein.

FIG. 12A is an example diagram illustrating a first operational mode of operating a power converter as described herein.

While in the boost mode BMA or (Boost Mode #A), and between time T0 and time T1 as well as between time TS/2 and time T4, the controller 140 controls switches T1, T2, T3, and T4 to ON states as shown in FIG. 12A. The controller 140 controls the switches Q1, Q2, Q3, and Q4 to OFF states between time T0 and time T1 as well as between time TS/2 and time T4.

During such time ranges, while in boost mode BMA, the input voltage source 120 supplies the input voltage 121 to the node N1 of the inductor 143. The current iL through the inductor device 143 produces output voltage 123 at the node N2. For example, as previously discussed, the switches T1-T4 are all ON during mode BMA, providing a low impedance path between the node N5 and node N2. The voltage VTR across the transformer winding 142 is zero. The output current from node N2 is equal to the current iL.

Figure 12B:
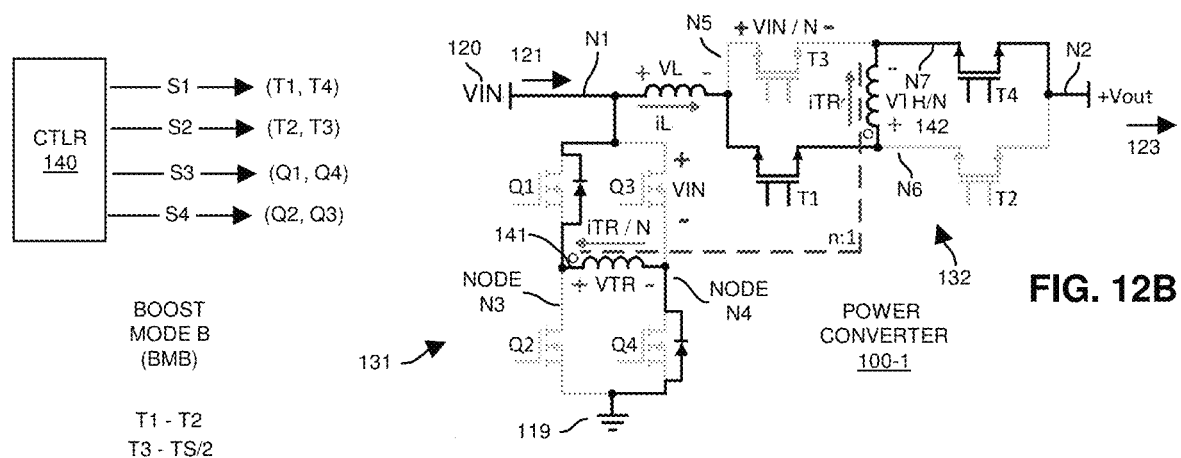
FIG. 12B is an example diagram illustrating a second operational mode of operating a power converter in a boost mode as described herein.

FIG. 12B is an example diagram illustrating a second operational mode of operating a power converter in a boost mode as described herein.

While in the boost mode BMB or (Boost Mode #B), and between time T1 and time T2, and between time T3 and time TS/2, the controller 140 controls switches T1 and T4 to ON states as shown in FIG. 12B. The controller 140 controls the switches Q1, Q2, Q3, Q4, T2, and T3 to OFF states between time T1 and time T2, and between time T3 and time TS/2.

While in boost mode BMB, the input voltage source 120 supplies the input voltage 121 to the node N1 of the inductor 143. The current iL through the inductor device 143 flows through switch T1, transformer winding 142, and switch T4, contributing to generation of the output voltage 123 at the node N2.

The OFF state of the switch T2 during the buck mode BMB prevents current from flowing through the switch T2 from node N6 to node N2 as well as prevents any current from flowing from node N2 to node N6.

The OFF state of the switch T3 during the buck mode BMB prevents current from flowing through the switch T3 from node N7 to node N5, as well as prevents current from flowing through the switch T3 from node N5 to node N7.

Yet further, during the boost mode BMB, the switch Q1 and switch Q4 operate in a free-wheeling mode. In such an instance, a combination of the parasitic diode of switch Q4, transformer winding 141, and the parasitic diode of switch Q1 supports a flow of current iTR/N from the ground reference potential 119 to the input voltage source 120.

As previously discussed, the transformer winding 141 is magnetically coupled to the transformer winding 142. The current iTR/N through the transformer winding 141 contributes to the flow of current iTR through the transformer winding 142.

Accordingly, in the mode BMB, the output current outputted from the node N2 is based upon a combination of current iL through the inductor 143 as well as energy transferred between the transformer winding 141 to the transformer winding 142.

Figure 13A:
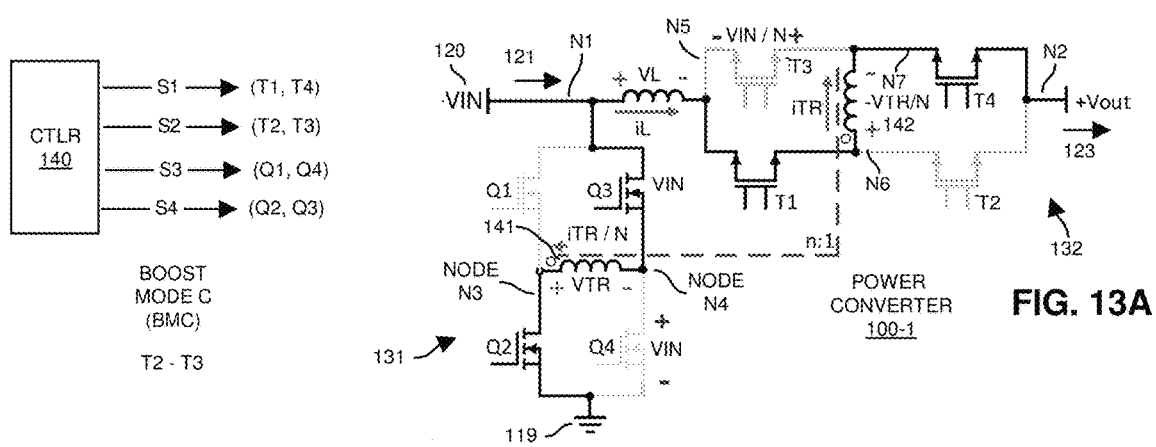
FIG. 13A is an example diagram illustrating a third operational mode of operating a power converter in a boost mode as described herein.

FIG. 13A is an example diagram illustrating a third operational mode of operating a power converter in a boost mode as described herein.

During time range T2 to T3, while in boost mode BMC, the input voltage source 120 supplies the input voltage 121 to the node N1 of the inductor 143. The current iL through the inductor device 143 flows through switch T1, transformer winding 142, and switch T1, contributing to generation of the output voltage 123 at the node N2.

The OFF state of the switch T2 during the mode BMC prevents current from flowing through the switch T2 from node N6 to node N2 as well as prevents any current from flowing from node N2 to node N6.

The OFF state of the switch T3 during the mode BMC prevents current from flowing through the switch T3 from node N5 to node N7, as well as prevents current from flowing through the switch T3 from node N7 to node N5.

Yet further, activation of the switch Q2 and the switch Q3 during the boost mode BMC causes connectivity of the transformer winding 141 between the node N1 and the ground reference potential 119. The activation of the switches Q2 and Q3 causes a flow of current through the transformer winding 141. As previously discussed, the transformer winding 141 is magnetically coupled to the transformer winding 142. The current iTR/N through the transformer winding 131 contributes to the flow of current iTR through the transformer winding 142.

Accordingly, the generation of the output voltage 123 and corresponding flow of current iTR through the transformer winding 142 is based upon a combination of energy associated with current iL through the inductor 143 as well as energy transferred between the transformer winding 141 to the transformer winding 142.

Figure 13B:
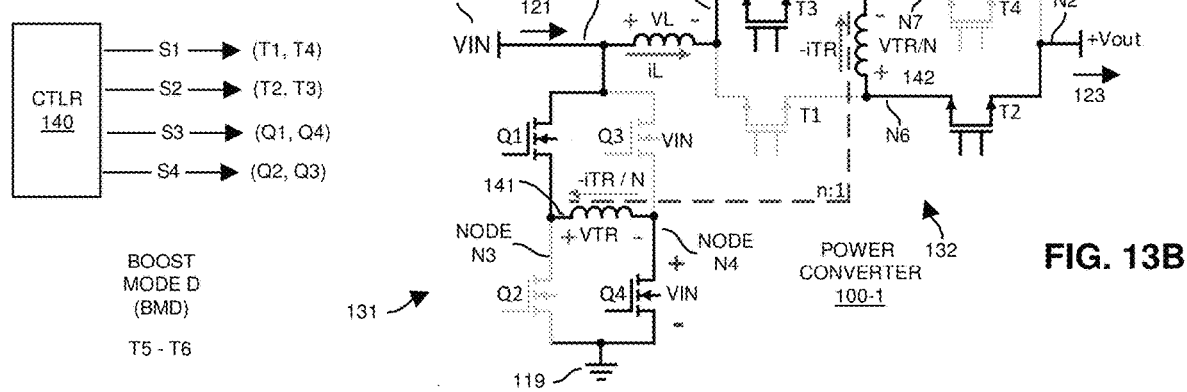
FIG. 13B is an example diagram illustrating a fourth operational mode of operating a power converter in a boost mode as described herein.

FIG. 13B is an example diagram illustrating a fourth operational mode of operating a power converter in a boost mode as described herein.

During time range T5 to T6, while in boost mode BMD, the input voltage source 120 supplies the input voltage 121 to the node N1 of the inductor 143. The current iL through the inductor device 143 flows through switch T3, transformer winding 142, and switch T2, contributing to generation of the output voltage 123 at the node N2.

The OFF state of the switch T1 during the mode BMD prevents current from flowing through the switch T1 from node N5 to node N6 as well as prevents any current from flowing from node N6 to node N5.

The OFF state of the switch T4 during the mode BMD prevents current from flowing through the switch T4 from node N2 to node N7, as well as prevents current from flowing through the switch T4 from node N7 to node N2.

Yet further, activation of the switch Q1 and the switch Q4 during the boost mode BMD causes connectivity of the transformer winding 141 between the node N1 and the ground reference potential 119. The activation of the switches Q1 and Q4 causes a flow of current through the transformer winding 141. As previously discussed, the transformer winding 141 is magnetically coupled to the transformer winding 142. The current –iTR/N through the transformer winding 131 contributes to the flow of current –iTR through the transformer winding 142.

Accordingly, the generation of the output voltage 123 and corresponding flow of current –iTR through the transformer winding 142 is based upon a combination of energy associated with current iL through the inductor 143 as well as energy transferred between the transformer winding 141 to the transformer winding 142.

Figure 14:
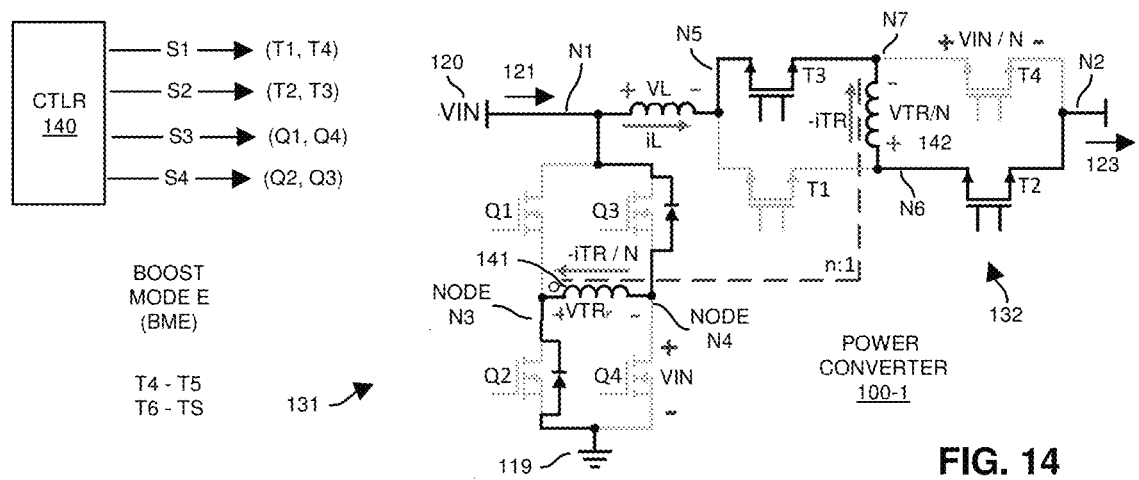
FIG. 14 is an example diagram illustrating a fifth operational mode of operating a power converter in a boost mode as described herein.

FIG. 14 is an example diagram illustrating a fifth operational mode of operating a power converter in a boost mode as described herein.

While in the boost mode BME or (Boost Mode #E), and between time T4 and time T5, and between time T6 and time TS, the controller 140 controls switches T2 and T3 to ON states as shown in FIG. 14. The controller 140 controls the switches Q1, Q2, Q3, Q4, T1, and T4 to OFF states between time T4 and time T5, and between time T6 and time TS.

While in boost mode BME, the input voltage source 120 supplies the input voltage 121 to the node N1 of the inductor 143. The current iL through the inductor device 143 flows through switch T3, transformer winding 142, and switch T2, contributing to generation of the output voltage 123 at the node N2.

The OFF state of the switch T1 during the buck mode BME prevents current from flowing through the switch T1 from node N5 to node N6 as well as prevents any current from flowing from node N6 to node N5.

The OFF state of the switch T4 during the buck mode BME prevents current from flowing through the switch T4 from node N7 to node N2, as well as prevents current from flowing through the switch T4 from node N2 to node N7.

Yet further, during the boost mode BME, the switch Q2 and switch Q3 operate in a free-wheeling mode. In such an instance, a combination of the parasitic diode of switch Q2, transformer winding 141, and the parasitic diode of switch Q3 supports a flow of current iTR/N from the ground reference potential 119 to the input voltage source 120 (or a flow of current –iTR/N from the input voltage source 120 to the ground reference potential 119).

As previously discussed, the transformer winding 141 is magnetically coupled to the transformer winding 142. The current –iTR/N through the transformer winding 131 contributes to the flow of current –iTR through the transformer winding 142.

Accordingly, the output current associated with generation of the output voltage 123 in mode BME is based upon a combination of current iL through the inductor 143 as well as energy transferred between the transformer winding 141 to the transformer winding 142.

Figure 15:
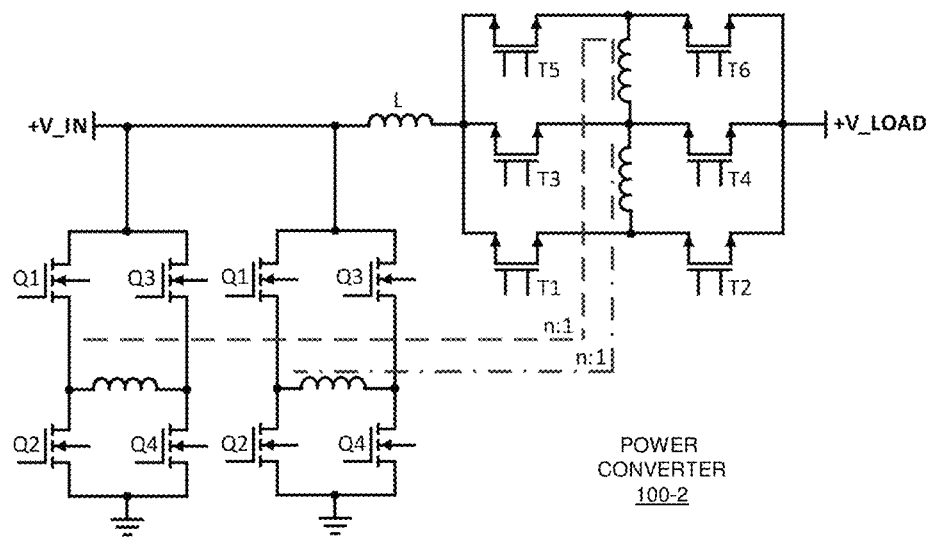
FIG. 15 is an example diagram illustrating implementation of a buck boost converter as described herein.

FIG. 15 is an example diagram illustrating implementation of a buck boost converter as described herein.

The power converter 100-2 in FIG. 15 shows an implementation of switches T1-T6 such as 4-quadrant switches, or bidirectional, power devices. Via control provided by the controller 140, the secondary side transformer windings (windings connected to switch devices T1-T6) can be connected either in parallel or in series in order to increase the converter voltage gain. Moreover, conduction losses are reduced since the current path is distributed among more power devices and transformer windings. Accordingly, the power converter 100-2 is suitable for extended voltage range and power range applications.

Figure 16:
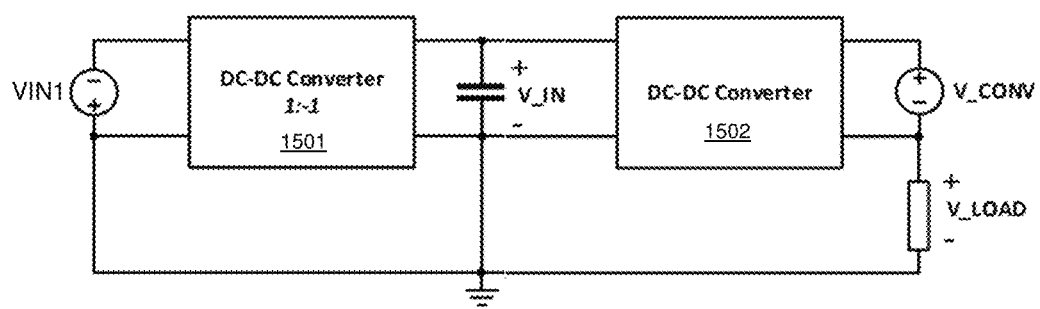
FIG. 16 is an example diagram illustrating a differential processing power architecture with an inverting pre-stage as described herein.

FIG. 16 is an example diagram illustrating a differential processing power architecture with an inverting pre-stage as described herein.

Note that, for systems with a negative input voltage, the power supply circuitry as discussed herein can be configured to include a first stage 1501 with a gain of –1, such as to invert the voltage polarity of the input voltage VIN1. The second stage 1502 including the conventional 4 stages buck-boost converter perform the voltage regulation. FIG. 15 shows an embodiment where a first stage 1501, such as composed for example by an LLC or switched capacitor topology, and a second stage 1502 implementing the power converter 100 as discussed herein.

Figure 17:
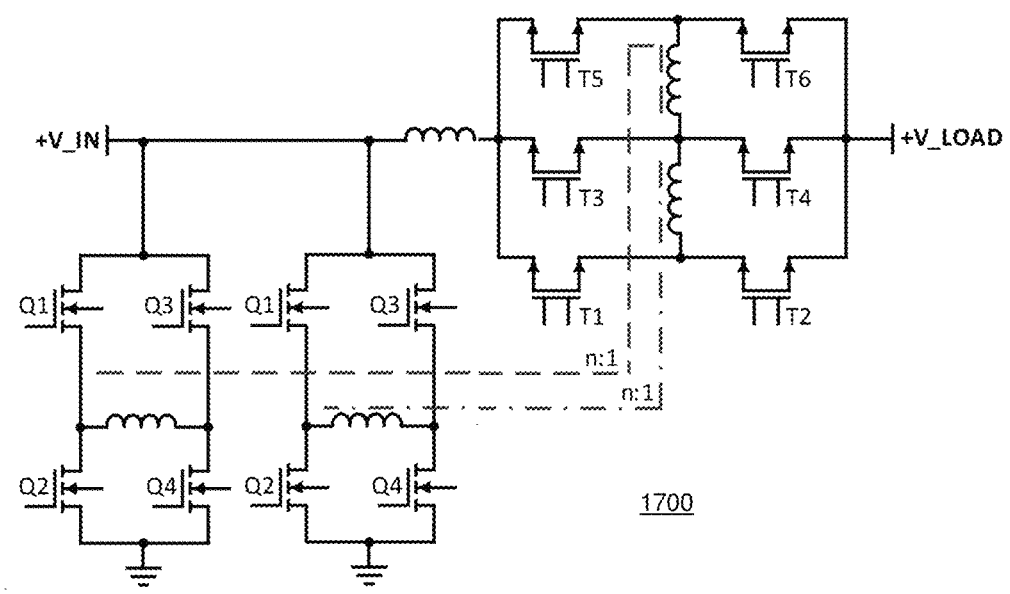
FIG. 17 is an example diagram illustrating implementation of a power converter as described herein.

FIG. 17 is an example diagram of a power converter as described herein. In this example, the power converter 1700 is an extended voltage range buck-boost converter providing bidirectional power processing such as conversion of a voltage at node.

Figure 18:
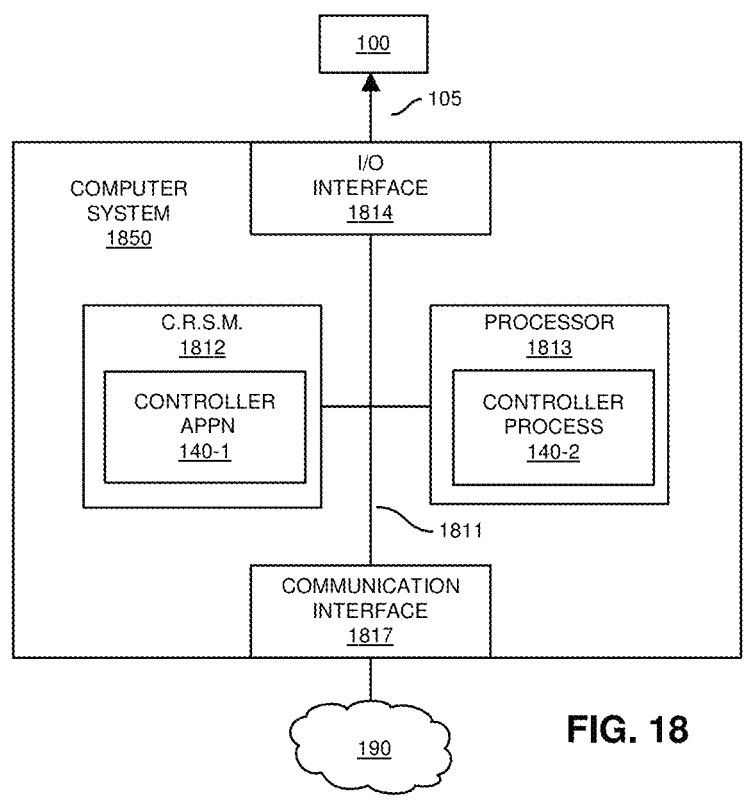
FIG. 18 is an example diagram illustrating computer processor hardware and execution of software instructions to implement one or more methods as discussed herein.

FIG. 18 is an example block diagram of a computer device for implementing any of the operations and methods as discussed herein.

As shown, computer system 1800 (such as implemented by any of one or more resources such as controller 140, etc.) of the present example includes an interconnect 1811 that couples computer readable storage media 1812 such as a non-transitory type of media (or hardware storage media) in which digital information can be stored and retrieved, a processor 1813 (e.g., computer processor hardware such as one or more processor devices), I/O interface 1814, and a communications interface 1817.

I/O interface 1814 provides connectivity to any suitable circuitry or component such as power converter 100.

Computer readable storage medium 1812 can be any hardware storage resource or device such as memory, optical storage, hard drive, floppy disk, etc. In one example, the computer readable storage medium 1812 stores instructions and/or data used by the controller application 140-1 to perform any of the operations as described herein. Further in this example, communications interface 1817 enables the computer system 1800 and processor 1813 to communicate over a resource such as network 190 to retrieve information from remote sources and communicate with other computers.

As shown, computer readable storage media 1812 is encoded with controller application 140-1 (e.g., software, firmware, etc.) executed by processor 1813. Controller application 140-1 can be configured to include instructions to implement any of the operations as discussed herein.

During operation of one example, processor 1813 accesses computer readable storage media 1812 via the use of interconnect 1811 in order to launch, run, execute, interpret or otherwise perform the instructions in controller application 140-1 stored on computer readable storage medium 1812.

Execution of the controller application 140-1 produces processing functionality such as controller process 140-2 in processor 1813. In other words, the controller process 140-2 associated with processor 1813 represents one or more aspects of executing controller application 140-1 within or upon the processor 1813 in the computer system 1800.

In accordance with different examples, note that computer system 1800 can be a micro-controller device, logic, hardware processor, hybrid analog/digital circuitry, etc., configured to control a power supply and perform any of the operations as described herein.

Functionality supported by the different resources will now be discussed via flowchart 1900 in FIG. 19. Note that the steps in the flowcharts below can be executed in any suitable order.

Figure 19:
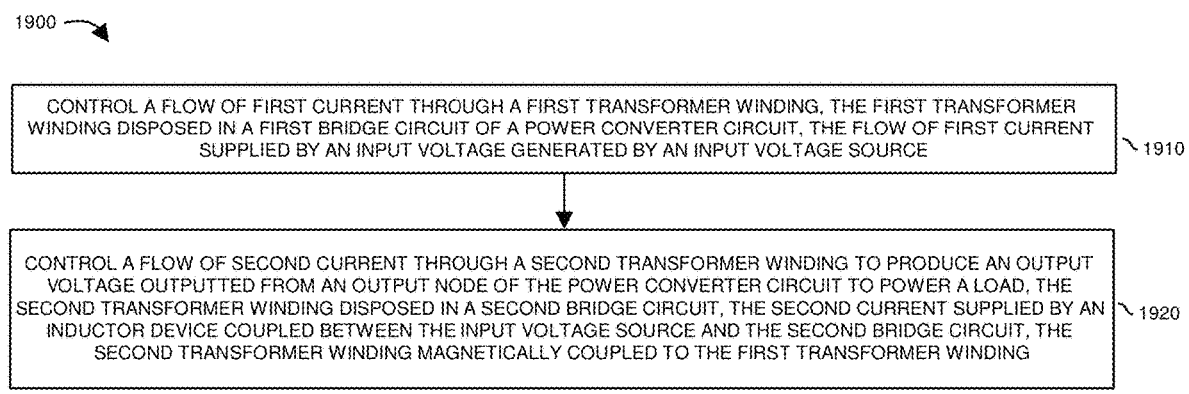
FIG. 19 is an example diagram illustrating a method as discussed herein.

FIG. 19 is an example diagram illustrating a method of operating a power converter as discussed herein.

In processing operation 1910 of flowchart 1900, the controller 140 controls a flow of first current through a first transformer winding 141. The first transformer winding 141 is disposed in a first bridge circuit 131 of a power converter 100 circuit. The flow of first current through the transformer winding 141 is supplied by an input voltage generated by an input voltage source.

In processing operation 1920, the controller 140 controls a flow of second current through a second transformer winding 142 to produce an output voltage 123 outputted from an output node of the power converter 100 to power a load. The second transformer winding 142 is disposed in a second bridge circuit 132. The second current is supplied by an inductor device 143 coupled between the input voltage source 120 and the second bridge circuit 132. The second transformer winding 142 is magnetically coupled to the first transformer winding 141.

Note again that techniques herein are well suited for use in circuit applications such as those that implement power conversion. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

The invention claimed is:

1. An apparatus comprising:
a first bridge circuit operative to receive an input voltage supplied by an input voltage source;
an inductor operative to receive the input voltage;
a second bridge circuit, the inductor providing coupling of the input voltage source to the second bridge circuit, the second bridge circuit operative to produce an output voltage to power a load;
an input node to receive the input voltage from the input voltage source;
an output node to output the output voltage; and
a circuit path including the inductor and the second bridge circuit connected in series between the input node and the output node.

2. The apparatus as in claim 1, wherein the second bridge circuit includes a first switch and a second switch, each of which supports bidirectional voltage blocking depending on switch control settings supplied to the first switch and the second switch by a controller.

3. The apparatus as in claim 1 further comprising:
a transformer operative to provide coupling of the first bridge circuit to the second bridge circuit.

4. The apparatus as in claim 3, wherein the transformer includes a first transformer winding and a second transformer winding;
wherein the first transformer winding is disposed in the first bridge circuit; and
wherein the second transformer winding is disposed in the second bridge circuit, the first transformer winding magnetically coupled to the second transformer winding.

5. The apparatus as in claim 1, wherein the first bridge circuit includes first switches;
wherein the second bridge circuit includes second switches; and
the apparatus further comprising: a controller operative to control states of the first switches and the second switches to convert the input voltage into the output voltage based on an error voltage signal derived from a difference between a magnitude of the output voltage and a setpoint reference voltage.

6. The apparatus as in claim 1, wherein the inductor, the second bridge circuit, and the load are connected in series.

7. The apparatus as in claim 1 further comprising:
a first switch device disposed in the second bridge circuit, the first switch device being a 4-quadrant switch device;
a second switch device disposed in the second bridge circuit, the second switch device being a 4-quadrant switch device; and
a controller operative to control switching of the first switch device and the second switch device.

21

8. The apparatus as in claim 1, wherein the load is connected between the output node and a ground reference potential; and
wherein the first bridge circuit is connected between the input node and the ground reference potential.

9. The apparatus as in claim 8, wherein the first bridge circuit includes a first transformer winding; and
wherein the second bridge circuit includes a second transformer winding, the second transformer winding magnetically coupled to the first transformer winding.

10. The apparatus as in claim 1, wherein a first axial end of the inductor is coupled to receive first current from the input voltage source; and
wherein a second axial end of the inductor is coupled to supply the received first current to the second bridge circuit.

11. The apparatus as in claim 10, wherein the first bridge circuit is coupled to receive second current from the input voltage source; and
wherein the second current through the first bridge circuit controls a magnitude of current through a transformer winding of the second bridge circuit.

12. The apparatus as in claim 1 further comprising:
a controller operative to control a duty cycle of controlling switches in the second bridge circuit, the controller operative to prevent the duty cycle from falling below 50%.

13. The apparatus as in claim 1, wherein the first bridge circuit, the inductor device, and the second bridge circuit reside in power converter circuitry operative to generate the output voltage, the apparatus further comprising:
a controller operative to switch between operating the power converter circuitry in a buck mode and a boost mode depending on a magnitude of the output voltage with respect to a magnitude of the input voltage.

14. An apparatus comprising:
a first bridge circuit operative to receive an input voltage supplied by an input voltage source;
an inductor operative to receive the input voltage;
a second bridge circuit, the inductor providing coupling of the input voltage source to the second bridge circuit, the second bridge circuit operative to produce an output voltage to power a load;
a first transformer winding disposed in the first bridge circuit;
a second transformer winding disposed in the second bridge circuit; and
a controller operative to: i) control a flow of first current through the first transformer winding, the first flow of current supplied by the input voltage source, and ii) control a flow of second current through the second transformer winding to produce the output voltage, the flow of second current supplied by the input voltage source.

15. An apparatus comprising:
a first bridge circuit operative to receive an input voltage supplied by an input voltage source;
an inductor operative to receive the input voltage; and
a second bridge circuit, the inductor providing coupling of the input voltage source to the second bridge circuit, the second bridge circuit operative to produce an output voltage to power a load;
wherein the first bridge circuit includes a first transformer winding magnetically coupled to a second transformer winding disposed in the second bridge circuit, the apparatus further comprising:

22 a controller operative to: i) alternate a polarity of connecting the first transformer winding in a first circuit path extending through the first bridge circuit between the input voltage source and a ground reference potential, and ii) alternate a polarity of connecting the second transformer winding in a second circuit path extending between the inductor device and an output node outputting the output voltage.

16. An apparatus comprising:
a first bridge circuit operative to receive an input voltage supplied by an input voltage source;
an inductor operative to receive the input voltage;
a second bridge circuit, the inductor providing coupling of the input voltage source to the second bridge circuit, the second bridge circuit operative to produce an output voltage to power a load;
a controller operative to switch between: i) a first mode of bypassing a transformer winding in the second bridge circuit to convey current received from the inductor to an output node outputting the output voltage to power the load, and ii) a second mode of connecting the transformer winding in a series circuit path between the inductor and the output node to produce the output voltage to power the load.

17. An apparatus comprising:
a first bridge circuit operative to receive an input voltage supplied by an input voltage source;
an inductor operative to receive the input voltage;
a second bridge circuit, the inductor providing coupling of the input voltage source to the second bridge circuit, the second bridge circuit operative to produce an output voltage to power a load;
wherein the first bridge circuit is a first H-bridge circuit including a first transformer winding; and
wherein the second bridge circuit is a second H-bridge circuit including a second transformer winding, the second transformer winding magnetically coupled to the first transformer winding.

18. A method comprising:
controlling a flow of first current through a first transformer winding, the first transformer winding disposed in a first bridge circuit of a power converter circuit, the flow of first current supplied by an input voltage generated by an input voltage source; and
controlling a flow of second current through a second transformer winding to produce an output voltage outputted from an output node of the power converter circuit to power a load, the second transformer winding disposed in a second bridge circuit, the second current supplied by an inductor device coupled in series with the second bridge circuit between the input voltage source and the output node, the second transformer winding magnetically coupled to the first transformer winding.

19. The method as in claim 18, wherein controlling the flow of first current includes alternating a polarity of connecting the first transformer winding in a first circuit path extending between the input voltage source through the first bridge circuit to a ground reference potential; and
wherein controlling the second flow of current includes alternating a polarity of connecting the second transformer winding in a second circuit path extending between the inductor device through the second bridge circuit to the output node.

20. The method as in claim 18, wherein controlling the flow of the second current includes:

switching control operation of the second bridge circuit between: i) a first mode in which the second current bypasses the second transformer winding and is conveyed by the second bridge circuit from the inductor device to the output node, and ii) a second mode in which the second current received from the inductor device passes through the second transformer winding to the output node.

* * * * *